US008050210B2

(12) United States Patent
Yang et al.

(10) Patent No.: US 8,050,210 B2
(45) Date of Patent: Nov. 1, 2011

(54) METHOD AND APPARATUS FOR TRANSMITTING AND RECEIVING THE CONFIGURATION MODE OF SERVICE CARRIER FREQUENCY TIME SLOTS

(75) Inventors: Guang Yang, Beijing (CN); Xiaoqi Wang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 299 days.

(21) Appl. No.: 12/166,881

(22) Filed: Jul. 2, 2008

(65) Prior Publication Data
US 2009/0010181 A1    Jan. 8, 2009

(30) Foreign Application Priority Data
Jul. 5, 2007   (CN) .......................... 2007 1 0118425

(51) Int. Cl.
*H04H 20/71* (2008.01)
(52) U.S. Cl. ........................................ 370/312; 370/432
(58) Field of Classification Search .................. None
See application file for complete search history.

(56) References Cited

U.S. PATENT DOCUMENTS

| 7,058,407 | B2 * | 6/2006 | Chi et al. ...................... 455/449 |
| 2005/0078676 | A1 * | 4/2005 | Bae et al. ...................... 370/390 |
| 2005/0122938 | A1 * | 6/2005 | Kim et al. ..................... 370/335 |
| 2005/0175070 | A1 * | 8/2005 | Grob et al. .................... 375/141 |
| 2006/0018279 | A1 * | 1/2006 | Agrawal et al. ............... 370/330 |
| 2006/0072516 | A1 * | 4/2006 | Jeong et al. ................... 370/335 |
| 2006/0146745 | A1 * | 7/2006 | Cai et al. ...................... 370/328 |
| 2006/0156370 | A1 * | 7/2006 | Parantainen .................. 725/132 |

* cited by examiner

*Primary Examiner* — Kwang B Yao
*Assistant Examiner* — Alex Skripnikov
(74) *Attorney, Agent, or Firm* — Workman Nydegger

(57) ABSTRACT

The present invention discloses a method for transmitting the configuration mode of MBMS carrier frequency time slots, and a method for receiving the configuration mode of MBMS carrier frequency time slots. The present invention also discloses a RNC and a terminal. The present invention enables the terminal to ascertain the configuration mode of MBMS carrier frequency time slots, and performs appropriate combining operation on the basis of the capability of the terminal itself, hence reduces the workload on the terminal.

10 Claims, 5 Drawing Sheets

METHOD AND APPARATUS FOR TRANSMITTING AND RECEIVING THE CONFIGURATION MODE OF SERVICE CARRIER FREQUENCY TIME SLOTS

CROSS-REFERENCE TO RELATED APPLICATION

This application claims priority to and benefit of Chinese Application Serial No. 200710118425.2, filed on Jul. 5, 2007.

FIELD OF THE INVENTION

The present invention relates to Multimedia Broadcast/Multicast Service (MBMS). In particular, the present invention relates to a radio network controller (RNC), a terminal and a method for transmitting and receiving the configuration mode of service carrier frequency time slots.

BACKGROUND OF THE INVENTION

In MBMS services, a terminal residing in a cell, especially in the boundary area of a cell, may simultaneously receive identical MBMS signals from multiple cells. In order to achieve the purposes of increasing receive gain and improving signal receiving effect, with the identical MBMS signals, there are two configuration modes for the time slots of the carrier frequency that carries the MBMS service. One mode is the MBMS single frequency network (MBSFN) mode, also known as the SFN mode, that is, for a same MBMS service all the neighboring base stations use a same scrambling code and synchronously transmit identical radio signals. As shown in FIG. 9, the signals on the same channel 6 are simultaneously transmitted to a terminal through path 61 and path 62, respectively. Accordingly, the terminal treats the signals from different base stations as multi-path signals, and performs over-the-air signal combining on the multi-path signals to achieve the purposes of increasing receive gain and improving signal receiving effect. The other mode is the chip combining mode, that is, for a same MBMS service, each base station uses its own scrambling code to scramble the signals, and the base stations synchronously transmit different radio signals of the same content data. Accordingly, the terminal uses the chip combining mode, i.e. the multi-cell joint detection method, to perform chip-level combining on the different received radio signals of the same content data, so as to achieve the purpose of improving signal receiving effect.

According to the combining mode of the base station configuration described above, the configuration mode of MBMS carrier frequency time slots utilized by a base station determines which scramble mode is used in MBMS services by the base station, and which mode is used by the terminal to perform combining. Hence, the terminal needs to choose corresponding combining mode on the basis of the configuration mode of the MBMS carrier frequency time slots of its cell.

The conventional method for enabling the terminal to be aware of the configuration mode of the MBMS carrier frequency time slots of the base station is detailed as follows: a radio network controller (RNC), by setting the value of the information unit "MBSFN only service" in the system information broadcast 3 (SIB3), enables the terminal to obtain the MBMS of the base station; when the value of "MBSFN only service" is 1, it shows that the cell carries an MBMS service and all of the time slots within the cell use the SFN configuration mode. The user equipment (UE) reads the information unit in SIB3, and then knows that all of the time slots within the cell are configured with the SFN mode. Thus the terminal does not need to further perform operations such as same/different-frequency measurement, neighboring cell information reading, etc.

The shortcomings of the conventional method include: when part or all of time slots are configured as the chip mode, the terminal can not obtain the configuration mode of MBMS service carrier frequency time slots of the base station; for terminals that are not capable of performing chip combining, useless operations such as reading the chip-combining-related information from neighboring cells are still carried out, thus increase the load on the terminal. Therefore, there is a need for a method and system to overcome these shortcomings.

BRIEF SUMMARY OF THE INVENTION

One aspect of the embodiments of the present invention is to provide a method for transmitting a configuration mode of Multimedia Broadcast/Multicast Service (MBMS) carrier frequency time slots and a radio network controller (RNC), thus enable a terminal to obtain the knowledge of whether or not chip combining mode is configured on the MBMS carrier frequency time slots.

Another aspect of the embodiments of the present invention is to provide a method and a terminal for receiving the configuration mode of MBMS carrier frequency time slots, thus enable the terminal to perform combining on MBMS data signals on the basis of the configuration mode information of MBMS carrier frequency time slots as well as the capability of the terminal.

One embodiment of the present invention provides a method for transmitting the configuration mode of MBMS carrier frequency time slots, comprising steps of: obtaining the configuration mode of each time slot on a carrier frequency that carries an MBMS service; setting the information on whether or not there are time slots configured as chip combining mode into a message that will be transmitted to a terminal; and transmitting the message to the terminal.

An alternative embodiment of the present invention provides a radio network controller, comprising: a carrier frequency obtaining module, a configuration obtaining module, an information setting module, and a transmitting module, wherein, the carrier frequency obtaining module is used for obtaining a carrier frequency that carries an MBMS service; the configuration obtaining module is used for obtaining the configuration mode of each time slot on the carrier frequency; the information setting module is used for setting the information on whether or not there are time slots configured as chip combining mode into a message that will be transmitted to a terminal, based on the configuration mode obtained by the configuration obtaining module; and the transmitting module is used for transmitting the message.

Another embodiment of the present invention provides a method for receiving the configuration mode of MBMS carrier frequency time slots, comprising steps of: a terminal receiving a message that contains information on whether or not there are time slots configured as chip combining mode; determining whether or not there are time slots configured as chip combining mode according to the received message; and when it is determined that there are time slots configured as chip combining mode, determining whether or not the terminal itself is capable of performing chip combining, and generating corresponding commands based on the determined result of whether the terminal is capable of performing chip combining.

Yet another embodiment of the present invention provides a terminal, which comprising: a receiving module, a configuration determining module, and a capability determining module, wherein, the receiving module is used to receive a message that contains information on whether or not there are time slots configured as chip combining mode; the configuration determining module is used to determine whether or not there are time slots configured as chip combining mode according to the message; the capability determining module is used to determine, based on the determined result of the configuration determining module, whether or not the terminal is capable of performing chip combining, and generate corresponding commands according to the determined result of whether the terminal is capable of performing chip combining.

Through the above technical solution, the embodiments of the present invention implement the transmission of the information on whether or not the MBMS carrier frequency time slots are configured as chip combining mode to the terminal, thus enable the terminal to obtain the information on the configuration mode of MBMS carrier frequency time slots, and perform the corresponding combining method according to the obtained information and the capability of the terminal. The embodiments of the present invention also avoid unnecessary operations by the terminal, reduce the workload on the terminal, provide space for the terminal to perform other operations, and improve the capability of the terminal.

The technical solution of the present invention is further described in detail through drawings and embodiments below.

DETAILED DESCRIPTION OF THE INVENTION

A radio network controller (RNC) provides the carrier frequency carrying the MBMS service and the combining mode configured for each time slot on the carrier frequency, within a system information broadcast (SIB) transmitted by the cell or a high-level signal of a MBMS control channel (MCCH).

Figure 1:
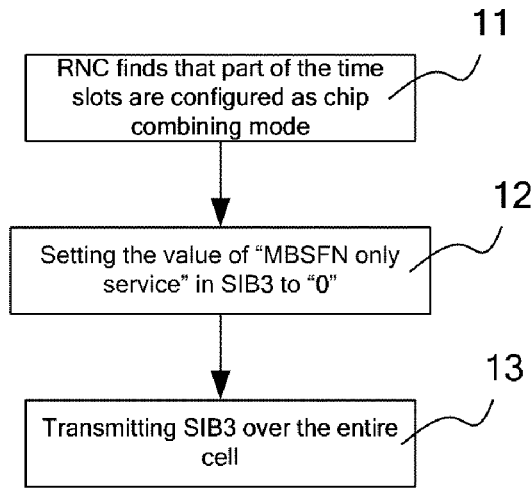
FIG. 1 is a flowchart of one embodiment of a method for transmitting the configuration mode of MBMS carrier frequency time slots according to the present invention.

FIG. 1 is a flowchart of an embodiment of a method for transmitting the configuration mode of MBMS carrier frequency time slots according to the present invention, the method comprising:

Step 11, a RNC obtains a carrier frequency carrying MBMS services, then determines the configuration mode of each time slot on the carrier frequency, and finds that part of the time slots are configured as SFN mode and part of the time slots are configured as chip combining mode;

Step 12, the RCN sets the value of the information unit "MBSFN only service" in SIB3 to "0", to show that the carrier frequency is carrying MBMS services, and multiple time slots of the carrier frequency are used for the chip combining mode, while other time slots used for the SFN mode;

Step 13, by transmitting SIB3 over the entire cell, the RNC transmits information specifying that there are time slots configured as the chip mode to a terminal.

Through this embodiment, a terminal is able to ascertain whether or not there are time slots configured as the chip combining mode, according to the value of the information unit "MBSFN only service" in SIB3. The terminal can then perform the operation of reading neighboring cell information or directly terminating, further based on the capability of the terminal, thus the terminal will be able to avoid unnecessary operations, reduce its workload, and increase its processing capability.

Figure 2:
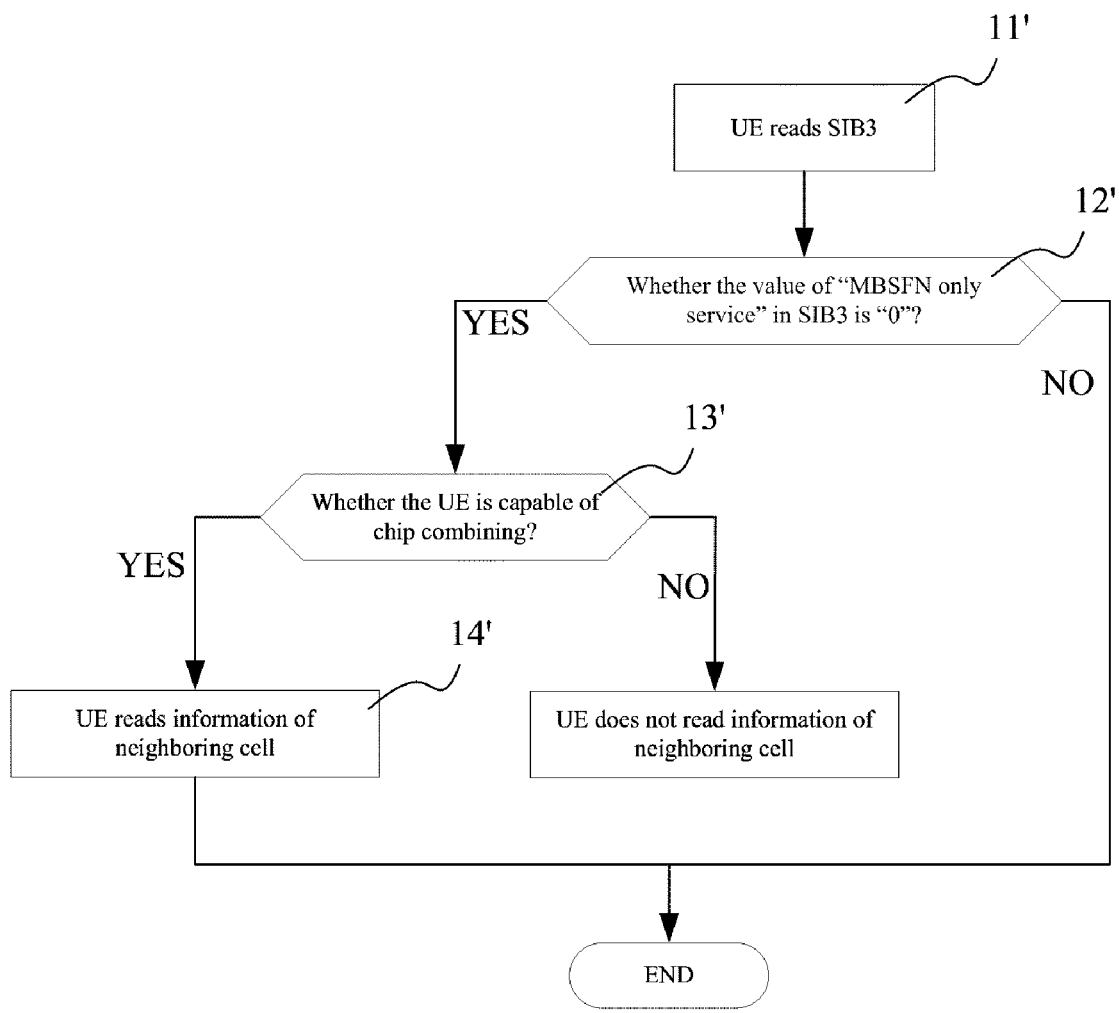
FIG. 2 is a flowchart of one embodiment of a method for receiving the configuration mode of MBMS carrier frequency time slots according to the present invention.

FIG. 2 is a flowchart of an embodiment of a method for receiving the configuration mode of MBMS carrier frequency time slots according to the present invention, the method comprising:

Step 11', a terminal of a cell receives SIB3, and reads the value of "MBSFN only service" in the SIB3;

Step 12', the terminal determines whether or not the value of "MBSFN only service" in the SIB3 is "0", if yes, executing the step 13'; otherwise, terminating the operation to avoid unnecessary operations by the terminal;

Step 13', the terminal determines whether or not the terminal itself has the capability for chip combining, if yes, executing the step 14'; otherwise, terminating the operation to avoid unnecessary operations by the terminal, thus increase the capability of the terminal in processing information;

Step 14', the terminal reads neighboring cell information.

Figure 3:
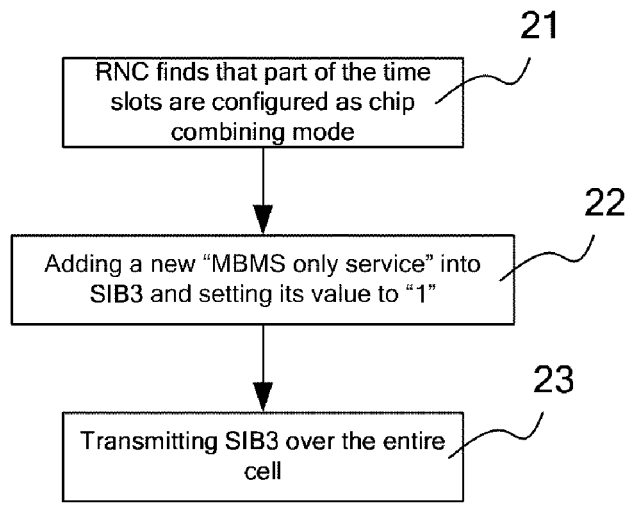
FIG. 3 is a flowchart of an alternative embodiment of a method for transmitting the configuration mode of MBMS carrier frequency time slots according to the present invention.

FIG. 3 is a flowchart of an alternative embodiment of a method for transmitting the configuration mode of MBMS carrier frequency time slots according to the present invention, the method comprising:

Step 21, a RNC obtains a carrier frequency that carries MBMS services, then determines the configuration mode of each time slot on the carrier frequency, and finds that part of the time slots are configured as SFN mode and part of the time slots are configured as chip mode;

Step 22, the RNC adds a new information unit "MBMS only service" into SIB3, and set the value of "MBMS only service" to "1", to show that the carrier frequency is carrying MBMS service, and multiple time slots of the carrier frequency are used for the chip mode, while other time slots can be used for the SFN mode;

Step 23, by transmitting SIB3 over the entire cell, the RNC transmits information specifying that there are time slots configured as the chip mode to the terminal.

Through this embodiment, a terminal is able to ascertain whether or not there are time slots configured as the chip mode, according to the value of the information unit "MBMS only service" in SIB3. The terminal can then perform the operation of reading neighboring cell information or directly terminating, further based on the capability of the terminal, thus the terminal will be able to avoid unnecessary operations, reduce its workload, and increase its processing capability.

Figure 4:
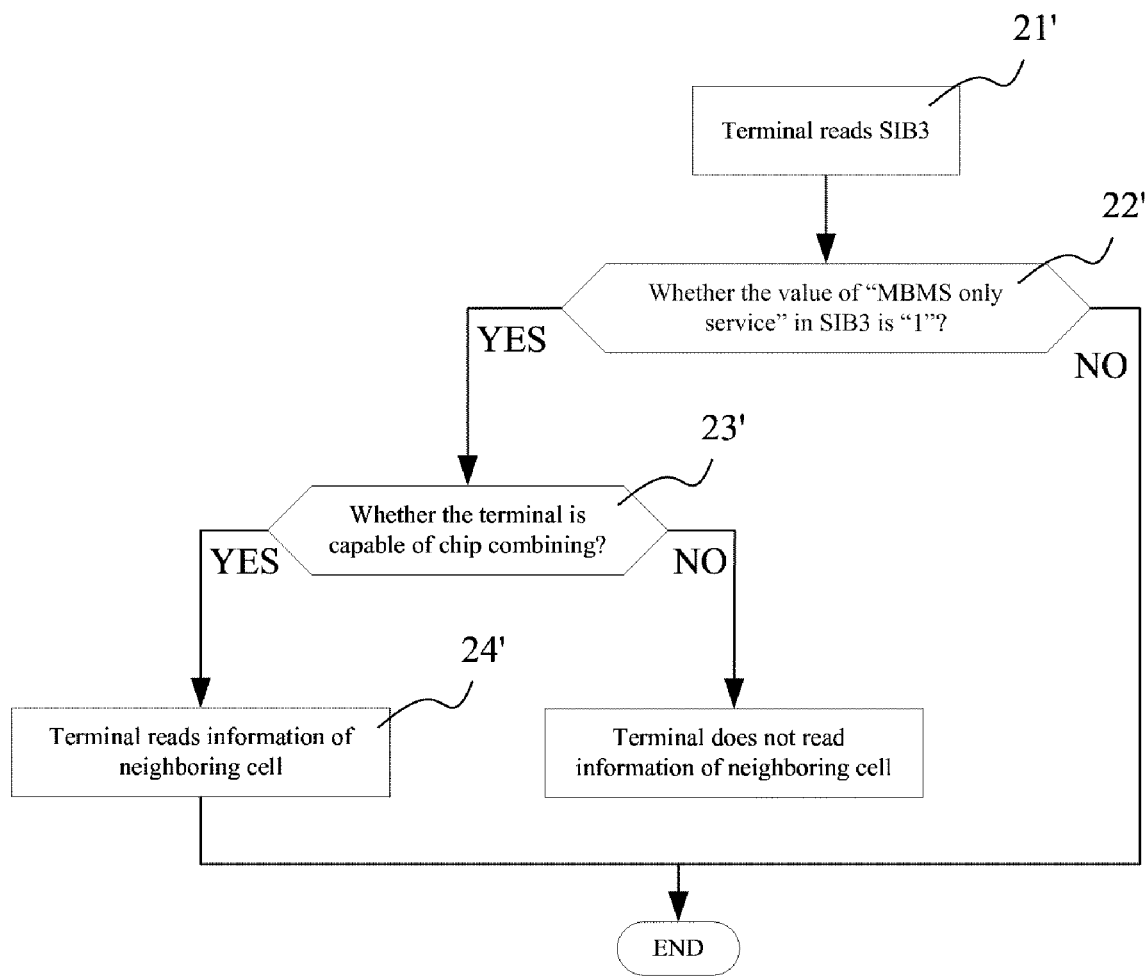
FIG. 4 is a flowchart of an alternative embodiment of a method for receiving the configuration mode of MBMS carrier frequency time slots according to the present invention.

FIG. 4 is a flowchart of an alternative embodiment of a method for receiving the configuration mode of MBMS carrier frequency time slots according to the present invention, the method comprising:

Step 21', a terminal of a cell receives SIB3, and reads the value of "MBMS only service" in SIB3;

Step 22', the terminal determines whether or not the value of "MBMS only service" in SIB3 is "1", if yes, executing the step 23'; otherwise, terminating the operation;

Step 23', the terminal determines whether or not the terminal itself has the capability for chip combining, if yes, executing the step 24'; otherwise, terminating the operation to avoid unnecessary operations by the terminal, thus increase the capability of the terminal in processing information;

Step 24', the terminal reads neighboring cell information.

Figure 5:
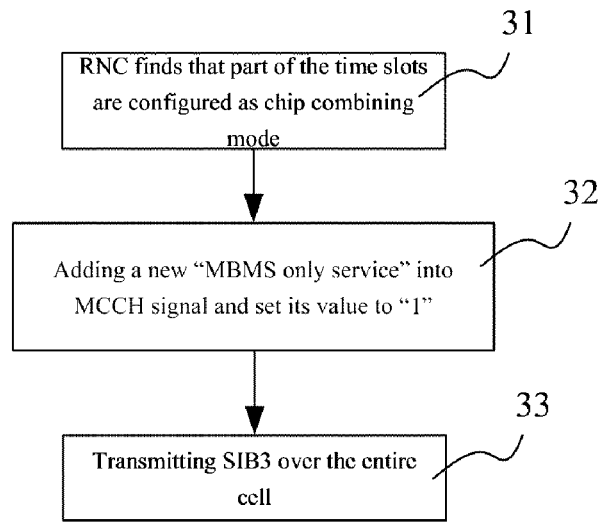
FIG. 5 is a flowchart of another embodiment of a method for transmitting the configuration mode of MBMS carrier frequency time slots according to the present invention.

FIG. 5 is a flowchart of another embodiment of a method for transmitting the configuration mode of MBMS carrier frequency time slots according to the present invention, the method comprising:

Step 31, a RNC obtains a carrier frequency carrying MBMS services, then determines the configuration mode of each time slot on the carrier frequency, and finds that part of the time slots are configured as SFN mode and part of the time slots are configured as chip combining mode;

Step 32, the RNC adds a new information unit "MBMS only service" into the "MBMS General Information" message of a MCCH high-level signal, and setting the value of "MBMS only service" to "1", to show that the carrier frequency is carrying MBMS services, and multiple time slots of the carrier frequency are used for the chip combining mode, while other time slots can be used for the SFN mode;

Step 33, the RNC transmits the "MBMS General Information" message to the cell using a point-to-multipoint (PTM) mode, to notify a terminal that there are time slots configured as the chip mode.

Through this embodiment, a terminal is able to ascertain whether or not there are time slots configured as the chip mode, according to the value of the information unit "MBMS only service" in the "MBMS General Information" message. The terminal can then perform the operation of reading neighboring cell information or directly terminating, further based on the capability of the terminal, thus the terminal will be able to avoid unnecessary operations, reduce its workload, and increase its processing capability.

Figure 6:
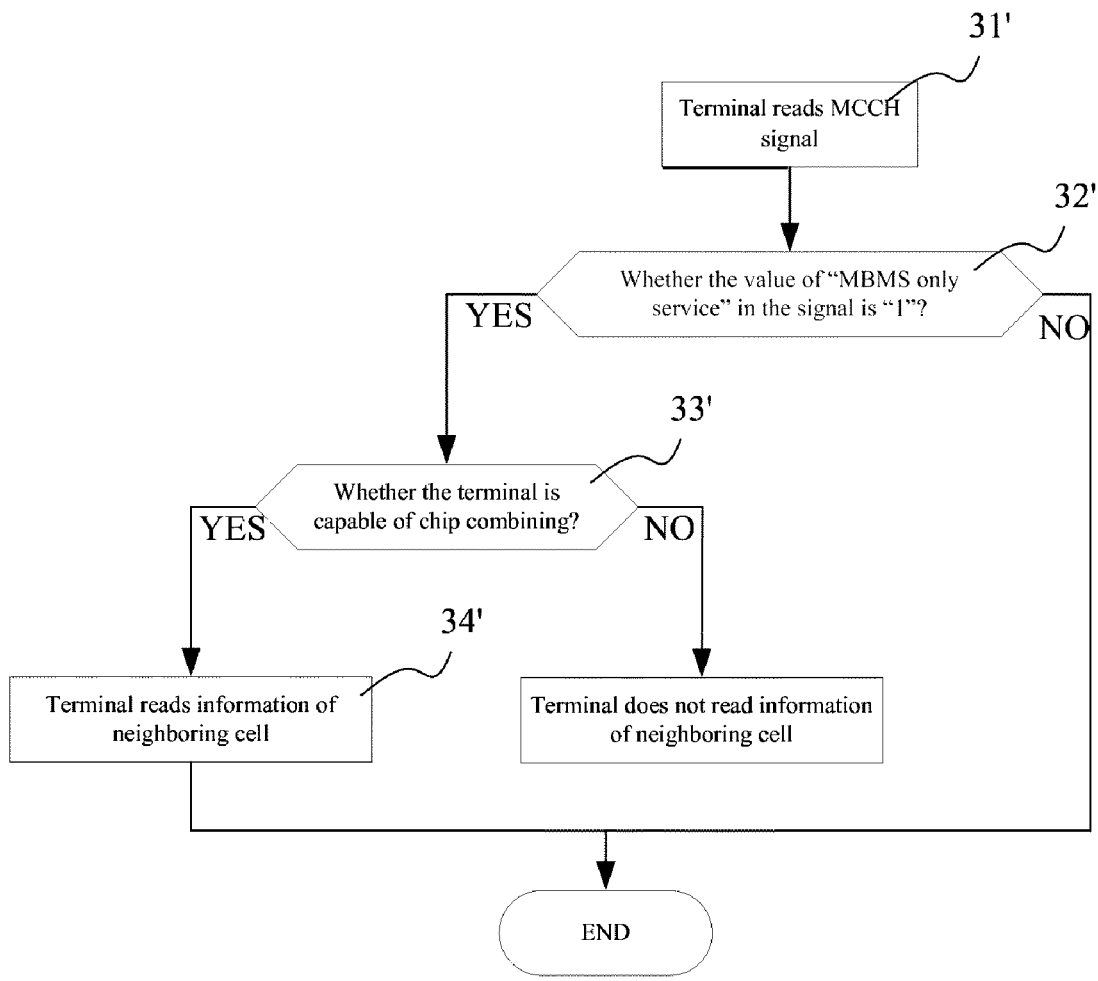
FIG. 6 is a flowchart of another embodiment of a method for receiving the configuration mode of MBMS carrier frequency time slots according to the present invention.

FIG. 6 is a flowchart of another embodiment of a method for receiving the configuration mode of MBMS carrier frequency time slots according to the present invention, the method comprising:

Step 31', a terminal of the cell receives the "MGMS General Information" message, and reads the value of "MBMS only service" in the "MGMS General Information" message;

Step 32', the terminal determines whether or not the value of "MBMS only service" in the "MBMS General Information" is "1", if yes, executing the step 33'; otherwise, terminating the operation;

Step 33', the terminal determines whether or not the terminal itself has the capability for chip combining, if yes, executing the step 34'; otherwise, terminating the operation to avoid unnecessary operations by the terminal, thus increase the capability of the terminal in processing information;

Step 34', the terminal reads neighboring cell information.

Figure 7:
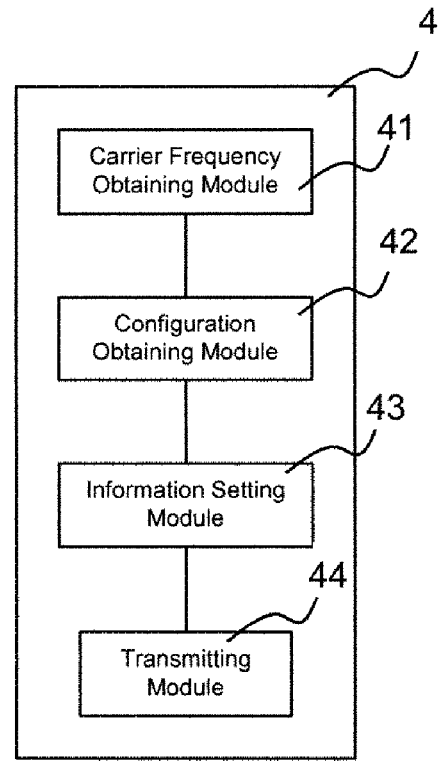
FIG. 7 is a schematic illustration of the structure of a radio network controller according to embodiments in the present invention.

FIG. 7 is a schematic illustration of the structure of a radio network controller 4 according to embodiments in the present invention. The radio network controller 4 comprising: a carrier frequency obtaining module 41, a configuration obtaining module 42, an information setting module 43, and a transmitting module 44. The carrier frequency obtaining module 41 is used for obtaining carrier frequency that carries MBMS service; the configuration obtaining module 42 is used for obtaining the configuration mode of each time slot of the carrier frequency; the information setting module 43 is used for setting the information on whether there are time slots configured as chip combining mode into a message that will be transmitted to a terminal, based on the configuration mode obtained by the configuration obtaining module 42, e.g. setting the value of "MBSFN only service" in SIB3 to "0", or setting the value of the "MBMS only service" in SIB3 to "1", or setting the value of "MBMS only service" in the "MBMS General Information" message to "1"; and the transmitting module 44 transmits the message containing information on whether there are time slots configured as the chip mode, e.g. SIB3 with the value of "MBSFN only service" setting to "0", or SIB3 with the value of "MBMS only service" setting to "1", or an "MBMS General Information" message with the value of "MBMS only service" setting to "1".

The information setting module presented in the embodiment of the radio net work controller (RNC) may comprise: a configuration determining module and a selecting module; the configuration determining module is used for determining whether or not the configuration mode obtained by the configuration obtaining module includes the chip combining mode; and the selecting mode is used for selecting the value of the information unit in the message based on the determined result from the configuration determining module. For example, when there are time slots configured as chip mode, "0" is selected as the value of "MBSFN only service" in SIB3, or "1" is selected as the value of "MBMS only service" in SIB3, or "1" is selected as the value of "MBMS only service" in the "MBMS General Information" message.

Figure 8:
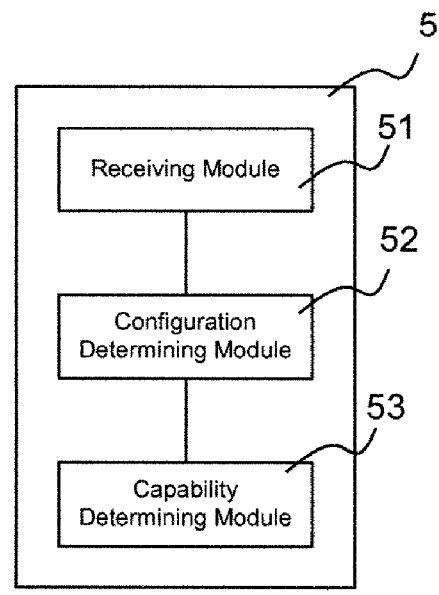
FIG. 8 is a schematic illustration of the structure of the terminal according to embodiments in the present invention.
Figure 9:
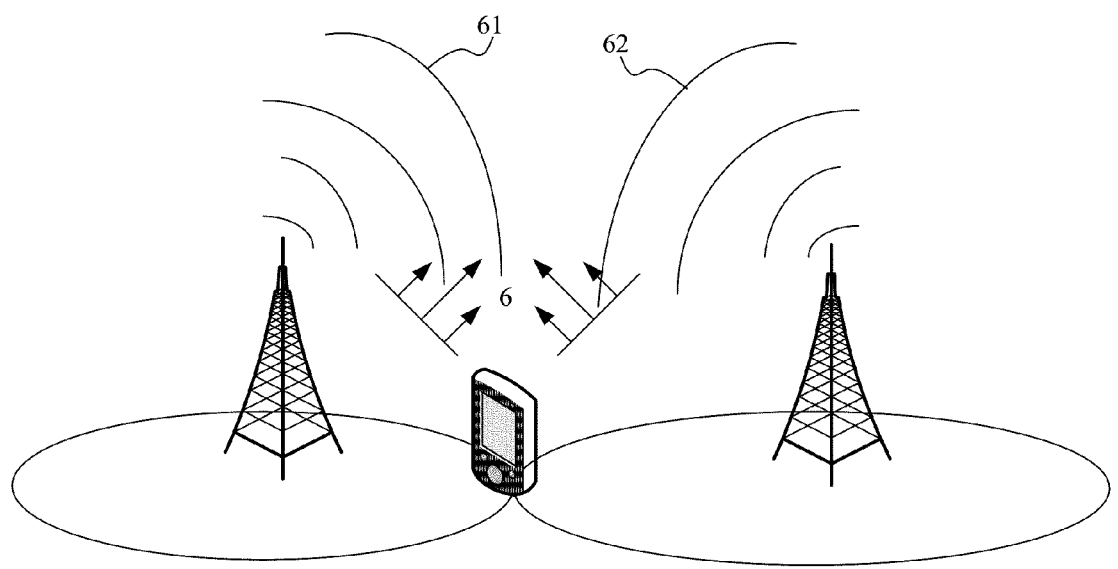
FIG. 9 is a schematic illustration of the MBMS enhancement technology according to the prior art.

FIG. 8 is a schematic illustration of the structure of a terminal 5 according to embodiments in the present invention. The terminal 5 consists of a receiving module 51, a configuration determining module 52 and a capability determining module 53. The receiving module 51 is used for receiving a message that contains the information on whether there are time slots configured as chip combining mode, e.g. SIB3 or the "MBMS General Information" message; the configuration determining module 52 is used for determining whether or not there are time slots configured as chip combining mode according to the value of the information unit in SIB3 or the "MBMS General Information" message; and the capability determining module 53 is used for determining whether or not the terminal 5 is capable of chip combining according to the determined result of the configuration determining module 52, as well as generating corresponding commands based on the determined result of whether the terminal 5 is capable of chip combining. The commands are executed by the terminal 5. For example, when the terminal 5 is capable of chip combining, the capability determining module 53 generates a combining command, and the terminal 5 executes the operation of reading neighboring cell information to perform chip combining; when the terminal 5 is incapable of chip combining, the capability determining module 53 generates a terminating command, and the terminal 5 terminates the operation. Hence, the terminal will only perform the reading of neighboring cell information on the precondition that the terminal is capable of chip combining, in order to avoid performing the useless operation of reading information when the terminal is incapable of chip combining, thus greatly reducing the load on the terminal, and improving the processing capability of the terminal.

It should be stated that the above embodiments are only used to describe the technical solutions of the present invention, and they are not used to impose any restriction or limit to the present invention. Despite the present invention having been elaborately described in reference to the above embodiments, it should be understood by a person skilled in the art: it is still possible to modify the technical solutions described in the above embodiments, or replace part of the technical features with equivalent ones, while these modifications and replacements do not detach the essence of corresponding technical solutions from the spirit and scope of the technical solutions described in each embodiment of the present invention.

What is claimed is:

1. A method for transmitting a configuration mode of Multimedia Broadcast/Multicast Service (MBMS) carrier frequency time slots, comprising:
    obtaining the configuration mode of each time slot on a carrier frequency that carries MBMS service; wherein, the configuration mode comprises a chip combining mode in which various base stations transmitting the same MBMS service scramble the MBMS service by using respective scrambling codes, and a terminal receiving the MBMS service performs a chip-level combining on received MBMS service signals from the base stations by using a joint detection method;
    setting information on whether or not there is at least one time slot configured as the chip combining mode into a message that is to be transmitted to a terminal;
    transmitting the message to the terminal;
    after receiving the message, the terminal determining whether or not there is at least one time slot configured as the chip combining mode;
    if it is determined that there is at least one time slot configured as the chip combining mode, determining, by the terminal, whether or not the terminal has a function of the chip-level combining; and
    if it is determined that the terminal has the function, reading by the terminal information of neighboring cells to perform the chip-level combining on received MBMS signals from base stations in the neighboring cells by using the joint detection method.

2. The method of claim 1, wherein the information on whether or not there is at least one time slot configured as the chip combining mode is represented by a value of an information unit in a system information broadcast message.

3. The method of claim 1, wherein the information on whether or not there is at least one time slot configured as the chip combining mode is represented by a value of a newly added information unit in a system information broadcast message.

4. The method of claim 1, wherein the information on whether or not there is at least one time slot configured as the chip combining mode is represented by a value of a newly added information unit in a message of a high-level signaling of a MBMS control channel (MCCH).

5. The method of claim 1, wherein the configuration mode further comprises a single frequency network mode in which various base stations transmitting the same MBMS service scramble the MBMS service by using the same scrambling code, and a terminal receiving the MBMS service performs a multi-path combining on received MBMS service signals from the base stations.

6. A method for transmitting a configuration mode of Multimedia Broadcast/Multicast Service (MBMS) carrier frequency time slots, comprising:
    obtaining the configuration mode of each time slot on a carrier frequency that carries MBMS service; wherein, the configuration mode comprises a chip combining mode in which various base stations transmitting the same MBMS service scramble the MBMS service by using respective scrambling codes, and a terminal receiving the MBMS service performs a chip-level combining on received MBMS service signals from the base stations by using a joint detection method;
    setting information on whether or not there is at least one time slot configured as the chip combining mode into a message that is to be transmitted to a terminal;
    transmitting the message to the terminal;
    after receiving the message, the terminal determining whether or not there is at least one time slot configured as the chip combining mode;
    if it is determined there is at least one time slot configured as the chip combining mode, determining, by the terminal, whether or not the terminal has a function of the chip-level combining; and
    if it is determined that the terminal does not have the function, operation of reading information of neighboring cells is not performed by the terminal.

7. The method of claim 6, wherein the information on whether or not there is at least one time slot configured as a chip combining mode is represented by a value of an information unit in a system information broadcast message.

8. The method of claim 6, wherein the information on whether or not there is at least one time slot configured as a chip combining mode is represented by a value of a newly added information unit in a system information broadcast message.

9. The method of claim 6, wherein the information on whether or not there is at least one time slot configured as a chip combining mode is represented by a value of a newly added information unit in a message of a high-level signaling of a MBMS control channel (MCCH).

10. The method of claim 6, wherein, the configuration mode further comprises a single frequency network mode in which various base stations transmitting the same MBMS service scramble the MBMS service by using the same scrambling code, and a terminal receiving the MBMS service performs a multi-path combining on received MBMS service signals from the base stations.

* * * * *